US012500333B2

(12) United States Patent
Rentz

(10) Patent No.: US 12,500,333 B2
(45) Date of Patent: Dec. 16, 2025

(54) ANTENNA FOR A SATELLITE RECEIVER

(71) Applicant: Deere & Company, Moline, IL (US)

(72) Inventor: Mark L. Rentz, Torrance, CA (US)

(73) Assignee: Deere & Company, Moline, IL (US)

( * ) Notice: Subject to any disclaimer, the term of this patent is extended or adjusted under 35 U.S.C. 154(b) by 208 days.

(21) Appl. No.: 18/448,225

(22) Filed: Aug. 11, 2023

(65) Prior Publication Data

US 2024/0178553 A1 May 30, 2024

Related U.S. Application Data

(60) Provisional application No. 63/385,416, filed on Nov. 30, 2022.

(51) Int. Cl.

*H01Q 1/28* (2006.01)
*H01Q 9/04* (2006.01)
*H01Q 21/00* (2006.01)
*H01Q 21/24* (2006.01)

(52) U.S. Cl.

CPC ........... *H01Q 1/288* (2013.01); *H01Q 9/0407* (2013.01); *H01Q 21/0006* (2013.01); *H01Q 21/24* (2013.01)

(58) Field of Classification Search

CPC .. H01Q 1/288; H01Q 1/3233; H01Q 21/0006; H01Q 21/065; H01Q 21/24

See application file for complete search history.

(56) References Cited

U.S. PATENT DOCUMENTS 5,173,711 A 12/1992 Takeuchi et al.
6,057,802 A 5/2000 Nealy et al.
6,067,053 A 5/2000 Runyon et al.
6,211,840 B1 4/2001 Wood et al.
6,259,407 B1 7/2001 Tran
6,993,259 B2 1/2006 Huang et al.

(Continued)

FOREIGN PATENT DOCUMENTS

CN 105044736 A 11/2015
CN 207490094 U 6/2018

(Continued)

OTHER PUBLICATIONS

The International Search Report and the Written Opinion of the International Searching Authority issued in counterpart application No. PCT/US21/70110, dated Mar. 31, 2021 (08 pages).

Charles D. McCarrick et al., A Combination Monopole/Quadrifilar Helix Antenna for S-band Terrestrial/Satellite Applications, Microwave Journal, May 1, 2001, pp. 1-12, [online], [retrieved on Feb. 11, 2020]. Retrieved from the Internet <URL: https://www.microwavejournal.com/articles/3206-a-combination-monopole-quadrifilar-helix-antenna-for-s-band-terrestrial-satellite-applications>.

(Continued)

*Primary Examiner* — Daniel Munoz

(57) ABSTRACT

Each antenna element within the array is oriented substantially coplanar with respect to the other antenna elements. The array overlies a primary dielectric substrate. A ground plane layer is spaced apart from the array of antenna elements by a first dielectric spacer. A beam-forming layer is spaced apart from the array of antenna elements by a second dielectric spacer. The beam-forming layer has a set of electrically conductive beam-forming antenna elements overlying a secondary dielectric substrate. A combining network is configured for combining the received electromagnetic signal components from the array, wherein the combining network cooperates to yield or receive a radiation pattern that is generally circularly polarized at the target wavelength range.

19 Claims, 9 Drawing Sheets

703

(56) References Cited

U.S. PATENT DOCUMENTS

| | | | | |
|---|---|---|---|---|
| 7,342,553 | B2 | 3/2008 | Soler Castany et al. | |
| 7,432,872 | B1 | 10/2008 | Waller | |
| 7,812,767 | B2 | 10/2010 | Seki et al. | |
| 7,990,329 | B2 | 8/2011 | Deng et al. | |
| 8,217,850 | B1 | 7/2012 | Jennings et al. | |
| 8,723,731 | B2 | 5/2014 | Tatarnikov et al. | |
| 8,803,748 | B2 | 8/2014 | Lim et al. | |
| 9,379,453 | B2 | 6/2016 | Rentz | |
| 9,755,306 | B1 | 9/2017 | Ogilvie | |
| 10,158,178 | B2 | 12/2018 | Bit-Babik et al. | |
| 10,505,279 | B2 | 12/2019 | Celik | |
| 10,581,147 | B1 | 3/2020 | West | |
| 10,923,810 | B2 | 2/2021 | Rentz | |
| 11,165,167 | B2 | 11/2021 | Rentz | |
| 11,342,665 | B1 * | 5/2022 | Reuveni | H01Q 1/2283 |
| 11,552,405 | B1 | 1/2023 | Bily et al. | |
| 2003/0052825 | A1 | 3/2003 | Rao et al. | |
| 2006/0164305 | A1 | 7/2006 | Chen et al. | |
| 2009/0174620 | A1 | 7/2009 | Kim et al. | |
| 2009/0322631 | A1 | 12/2009 | Huchard et al. | |
| 2010/0253587 | A1 | 10/2010 | Lindenmeier et al. | |
| 2010/0295750 | A1 | 11/2010 | See et al. | |
| 2011/0012808 | A1 | 1/2011 | Tatarnikov et al. | |
| 2011/0193761 | A1 | 8/2011 | Shinkai et al. | |
| 2011/0260939 | A1 | 10/2011 | Korva et al. | |
| 2012/0050122 | A1 | 3/2012 | Wu et al. | |
| 2013/0201066 | A1 | 8/2013 | Parsche | |
| 2013/0278475 | A1 | 10/2013 | Sabielny | |
| 2014/0176386 | A1 | 6/2014 | Rentz | |
| 2015/0077299 | A1 | 3/2015 | Tatarnikov et al. | |
| 2016/0261035 | A1 | 9/2016 | Chamseddine | |
| 2017/0040702 | A1 | 2/2017 | West et al. | |
| 2017/0149125 | A1 | 5/2017 | Huang et al. | |
| 2019/0348759 | A1 | 11/2019 | Walker et al. | |
| 2022/0352636 | A1 | 11/2022 | Yetisir | |
| 2024/0178567 | A1 * | 5/2024 | Sato | H01Q 9/0414 |

FOREIGN PATENT DOCUMENTS

| | | | |
|---|---|---|---|
| EP | 0540125 | A1 | 5/1993 |
| WO | WO 2011092311 | A2 | 8/2011 |

OTHER PUBLICATIONS

Jorge Simón et al., A Microstrip Second-Iteration Square Koch Dipole Antenna for TT&C Downlink Applications in Small Satellites, International Journal of Antennas and Propagation, Mar. 9, 2017, pp. 1-8, [online], [retrieved on Feb. 11, 2020]. Retrieved from the Internet <URL: https://www.hindawi.com/journals/ijap/2017/4825179/><10.1155/2017/4825179>.

G. Rushingabigwi et al., Design of a printed circuit board antenna for multiple utilizations in IEEE802.16a spectrum and beyond, IEEE Xplore Digital Library, Aug. 8-11, 2016, pp. 875-879, [online], [retrieved on Feb. 11, 2020]. Retrieved from the Internet URL:https://ieeexplore.ieee.org/abstract/document/7734506 <DOI:10.1109/PIERS.2016.7734506>.

Inverted-F antenna, pp. 1-7, [online], [retrieved on Feb. 11, 2020]. Retrieved from the Internet <URL: https://en.wikipedia.org/wiki/Inverted-F_antenna>.

High Performance Positioning in High Latitudes, pp. 1-2, [online], [retrieved on Feb. 11, 2020]. Retrieved from the Internet <URL: https://www.fugro.com/docs/default-source/about-fugro-doc/rovsa12216000mpbra5_sst_arctic_services.pdf?sfvrsn=dde01f1a_0>.

B.S. Geaghan et al, Communications to high latitudes using a commercial low Earth orbit satellite system, IEEE Xplore Digital Library, Apr. 30-May 2, 1996, pp. 407-415, [online], [retrieved on Feb. 11, 2020]. Retrieved from the Internet <URL: https://ieeexplore.ieee.org/document/561110><DOI:10.1109/TCC.1996.561110>.

Extended European Search Report and Written Opinion issued in European Patent Application No. 19181826.9, dated Dec. 10, 2019, in 08 pages.

Kunysz, W. et al., A Three Dimensional Choke Ring Ground Plane Antenna, In Proceedings of the 16th International Technical Meet¬ing of the Satellite Division of the Institute of Navigation, Sep. 2003, Portland (pp. 1883-1888).

The International Search Report and the Written Opinion of the International Searching Authority issued in counterpart application No. PCT/US2023/75568, dated Jan. 12, 2024 (12 pages).

* cited by examiner

702

ANTENNA FOR A SATELLITE RECEIVER

RELATED APPLICATIONS

This application claims priority to U.S. provisional application No. 63/385,416, filed Nov. 30, 2022, where the above applications are hereby incorporated by reference herein.

FIELD

This disclosure relates to an antenna for a satellite receiver.

BACKGROUND

In some background art, antennas for satellite receivers can provide performance that can be impacted by the polarization of the received signal or by parasitic coupling to a reflector. For example, the background art includes antennas, such as U.S. Pat. Nos. 9,379,453; 10,923,810 and 11,165,167. There is a need for an antenna system that is capable of receiving right-hand polarized signals or circularly polarized signals with actively-coupled beam-forming and with a front-to-back ratio that facilitates some isolation from electromagnetic noise and interference associated vehicle electronics, such as semiconductor switches that are used for control of electric machines.

SUMMARY

In accordance with one embodiment, an antenna system comprises an array assembly of metallic antenna elements for radiating or receiving generally circularly polarized electromagnetic signal components within a target wavelength range. Each antenna element within the array assembly is oriented substantially coplanar with respect to the other antenna elements in the array assembly. The array of antenna elements overlies a primary dielectric substrate. A ground plane assembly is spaced apart (e.g., vertically downward) from the array assembly of antenna elements by a first dielectric spacer. A beam-forming layer assembly is spaced apart (e.g., vertically upward) from the array assembly of antenna elements by a second dielectric spacer. The beam-forming layer assembly has a set of electrically conductive beam-forming antenna elements overlying a secondary dielectric substrate.

In accordance with another aspect of the antenna system, a combining network (e.g., combining circuitry) is configured for combining the received electromagnetic signal components from the array assembly, wherein the combining network cooperates to yield or receive a radiation pattern that is generally circularly polarized at the target wavelength range. First electrically conductive posts (e.g., outer electrically conductive sleeves) are configured to provide respective electrical coupling between the combining network of the ground plane assembly and the array of antenna elements: second electrically conductive posts (e.g., inner electrically conductive sleeves) are configured to provide respective electrical coupling between the array of antenna elements and the beam-forming layer assembly.

In accordance with yet another aspect of the disclosure, the first electrically conductive posts, the second electrically conductive posts or both may comprise monopoles that contribute to a vertically polarized component of the a substantially circularly polarized radiation pattern. Meanwhile, the array of antenna elements, or the array of antenna elements together with the beam-forming layer assembly provides or contributes to a radially polarized component of the substantially circularly polarized radiation pattern of the antenna.

DETAILED DESCRIPTION

In accordance with one embodiment, an antenna system 111 comprises an array of metallic antenna elements 112 for radiating or receiving electromagnetic signals, such as generally radially polarized signal components or generally circularly polarized electromagnetic signal components within a target wavelength range (or equivalent target frequency range). Each antenna element 112 within the array (e.g., array assembly 703) is oriented substantially coplanar with respect to the other antenna elements 112.

Figure 1:
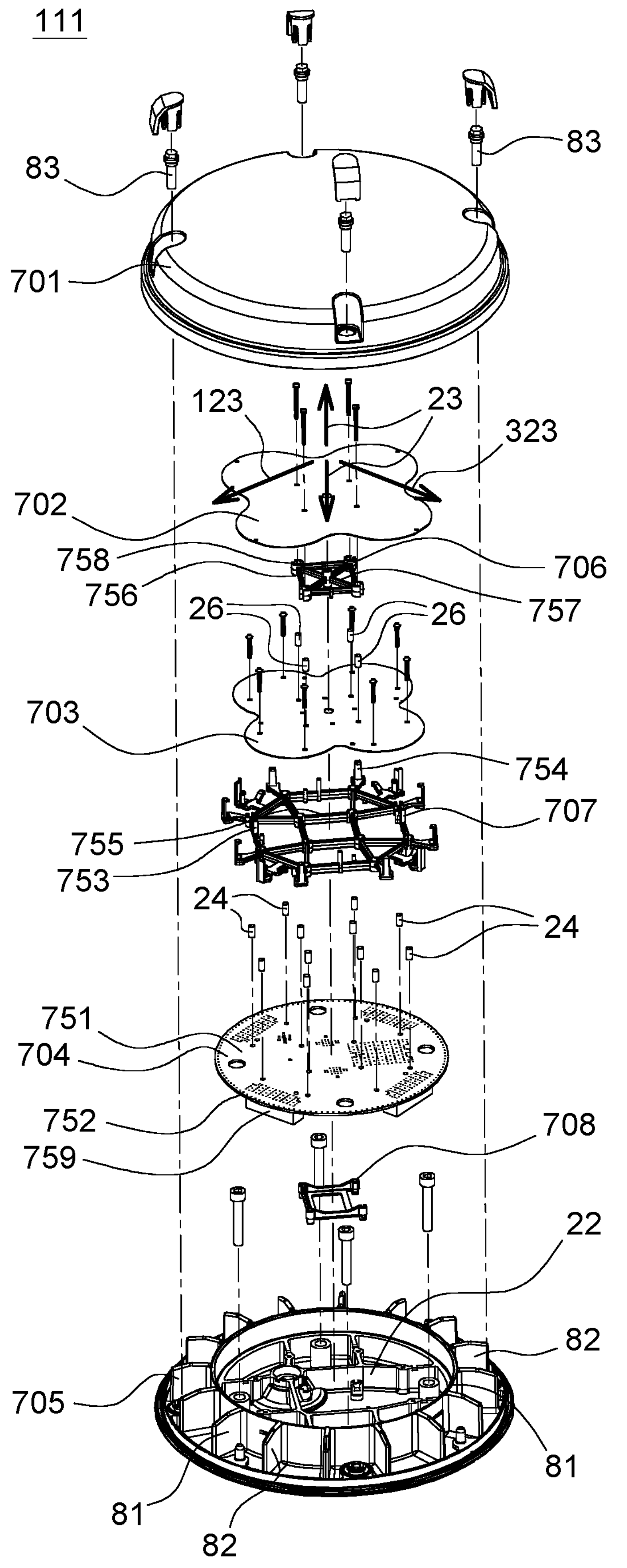
FIG. 1 is a top perspective, exploded view of one embodiment of the antenna system.
Figure 2:
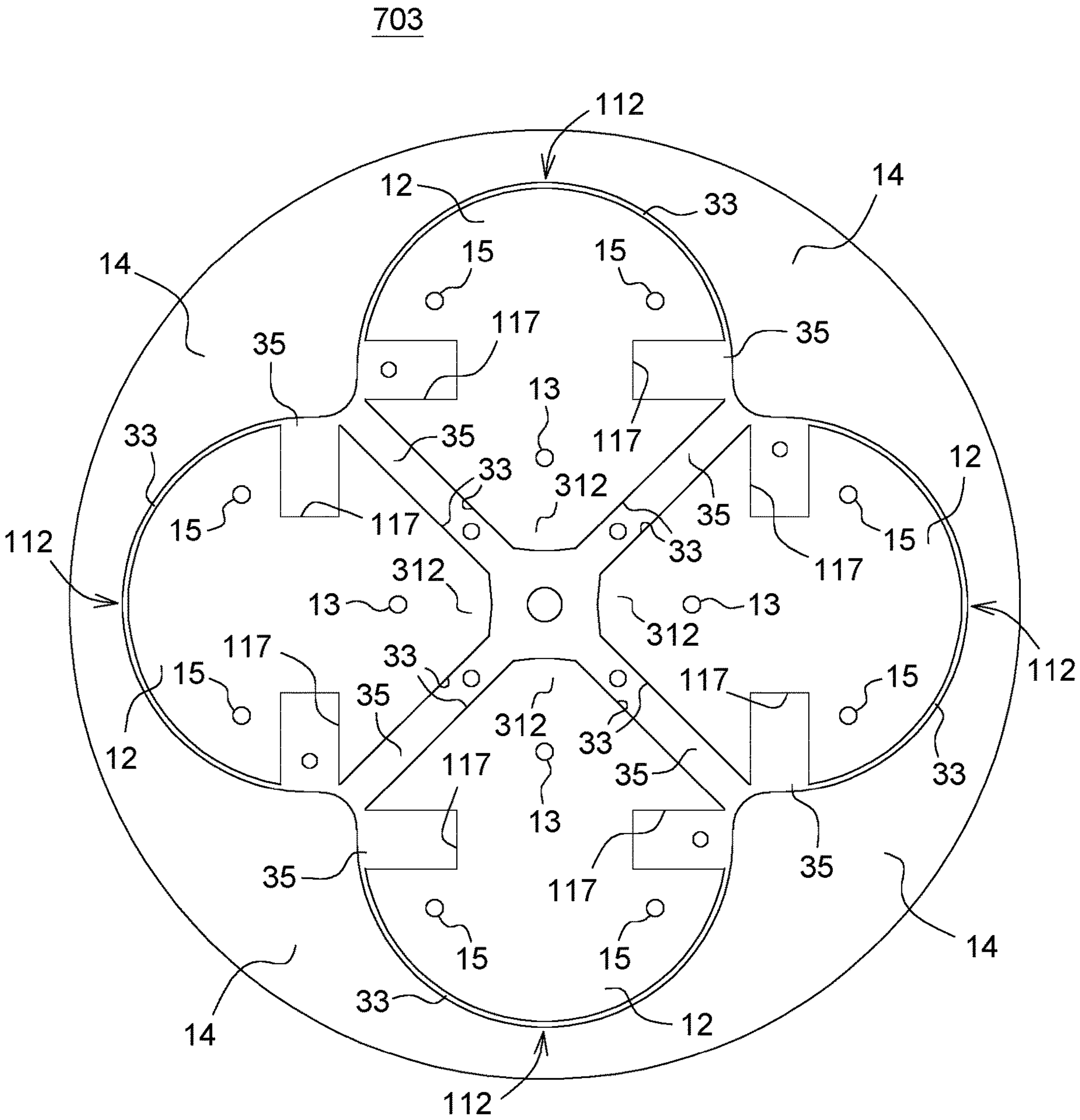
FIG. 2 is a plan view (e.g., top view or bottom view) of an array (assembly) of metallic antenna elements in accordance with the antenna system of FIG. 1.

In FIG. 1 and FIG. 2, an array assembly 703 (e.g., radiating layer) may comprise the array of antenna elements 112, a primary dielectric substrate 14, or both. The array of antenna elements 112 overlies a primary dielectric substrate 14. The primary dielectric substrate 14 may represent a separate layer from the array of a metallic antenna elements 112 within a series of laminated or adjacent layers (e.g., of a stratum). As used throughout this document, substantially; generally, or approximately means a tolerance of plus or minus ten percent of a parameter, angle, dimension, or measurement unless otherwise expressly stated.

Figure 3:
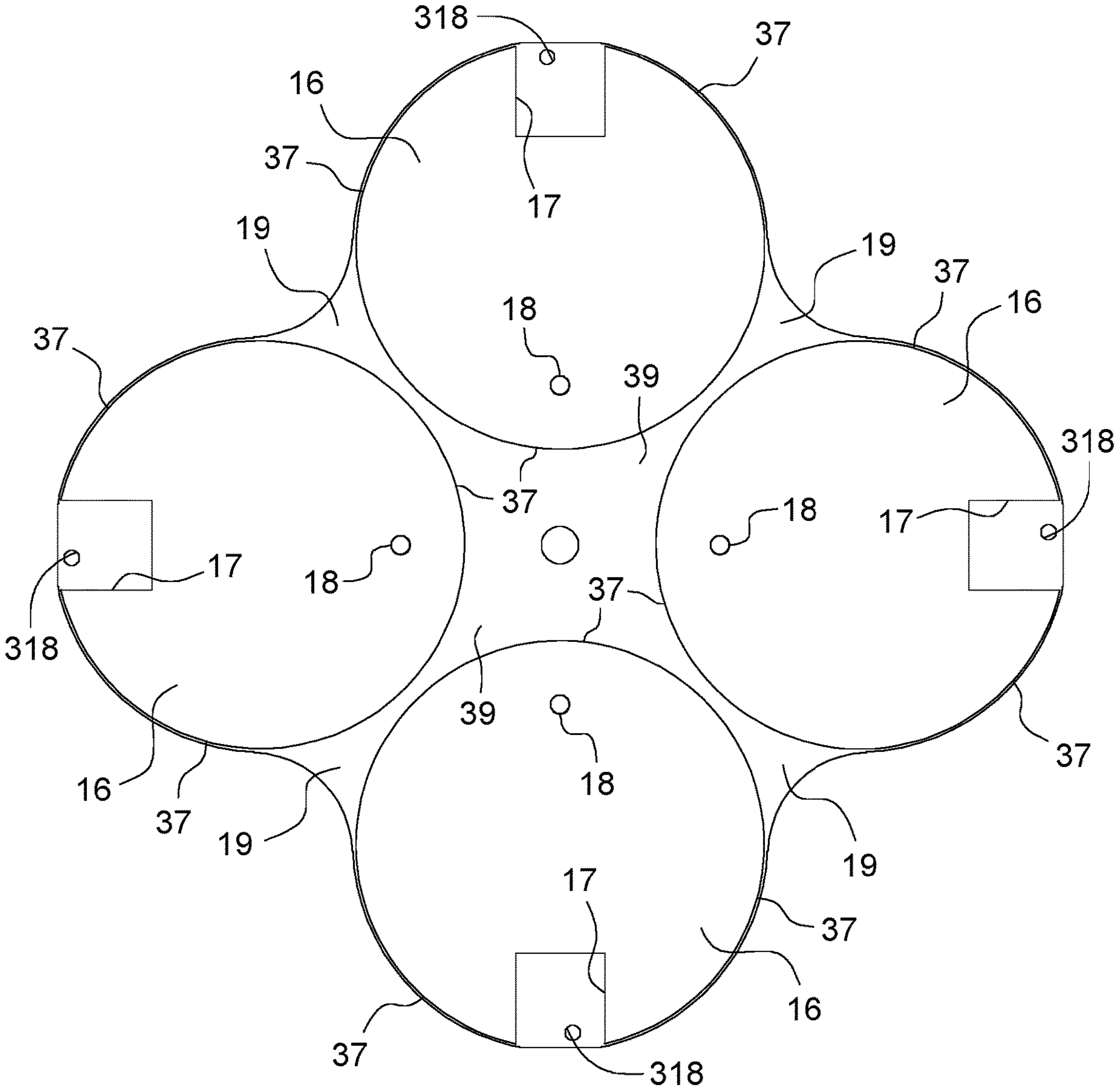
FIG. 3 is a plan view (e.g., top view or bottom view) of a beam-forming layer assembly in accordance with the antenna system of FIG. 1.

In FIG. 1, a ground plane assembly 704 is spaced apart (e.g., vertically downward) from the array assembly 703 of antenna elements 112 by a first dielectric spacer 707. A beam-forming layer (assembly) 702 is spaced apart from the array assembly 703 of antenna elements 112 by a second dielectric spacer 706. As best illustrated in FIG. 3, the beam-forming layer (assembly) 702 has a set of electrically conductive beam-forming antenna elements 16 overlying a secondary dielectric substrate 19.

The ground plane assembly 704 may comprise a circuit board upon which a combining network (211, 311, 411) can be incorporated, mounted, or installed. The combining network (211, 311, 411) provides an interface between the antenna of antenna system 111 and transmission line (e.g., coaxial cable) that can be connected to a receiver port.

A combining network (211, 311, 411) may comprise one or more of the following: signal combining circuitry; impedance matching circuitry; phase shifters, hybrids, combiners, hybrid combiners, 90 degree hybrid combiners, 180 degree hybrid combiners, splitters, in-phase splitters, isolators, circulators, amplifiers, low-noise amplifiers, filters, attenuators, and the like. The combining network (211, 311, 411) is configured for combining the received electromagnetic signal components or received signal contributions from one or more of the following: (a) an antenna elements 112 of the array assembly 703, (b) beam-forming antenna elements 16 of beam-forming layer (assembly) 702, (c) first electrically conductive posts 24 (e.g., first metal sleeves), (d) second electrically conductive posts 26 (e.g., second metal sleeves), (c) any combination of items a through d: further, the combining network (211, 311, 411) cooperates to yield or receive a radiation pattern that is generally circularly polarized (e.g., right-hand circularly polarized) at the target wavelength range.

In one embodiment, the first electrically conductive posts 24 (e.g., outer electrically conductive sleeves) are configured to provide respective electrical coupling (e.g., an electrical connection and mechanical connection) between the combining network (211, 311, 411) of the ground plane assembly 704 and the array of antenna elements 112: second electrically conductive posts 26 (e.g., inner electrically conductive sleeves) are configured to provide respective electrical coupling (e.g., an electrical connection and mechanical connection) between the array of antenna elements 112 and the beam-forming layer (assembly) 702. In some configurations, the first electrically conductive posts 24 are retained by the first dielectric spacer 707 (e.g., dielectric retainer) and the second electrically conductive posts 26 are retained by the second dielectric spacer 706 (e.g., second retainer).

In another aspect of the disclosure (e.g., in some embodiments), the first electrically conductive posts 24, the second electrically conductive posts 26, or both, may comprise monopole antenna elements that contribute to the a vertically polarized component of an aggregate substantially circularly polarized radiation pattern (e.g., in the far field that is suitable for reception of satellite or other communication signals). Meanwhile, the array assembly 703 of antenna elements 112, or the array of antenna elements 112 together with the beam-forming layer 702, provides or contributes to a radially polarized component of the substantially circularly polarized radiation pattern (e.g., in the far field that is suitable for reception of satellite or other communication signals).

A ground plane assembly 704 is spaced apart (e.g., vertically downward) from the array assembly 703 (e.g., radiating layer assembly), which comprises the array of antenna elements 112, by the first dielectric spacer 707, alone or together with the first electrically conductive posts 24. For example, as illustrated in FIG. 1, the first dielectric spacer 707 may comprise a framework that has a substantially polygonal border 753 with interior structural supports 755 (e.g., grid), where the polygonal border 753 (e.g., with one or more associated perimeter flanges) has vertical bores or (substantially) cylindrical recesses 754 to receive, accept or retain posts, sleeves (24), fasteners, substantially polygonal, or substantially cylindrical members. The first dielectric spacer 707 may be composed of a plastic, a polymer, or a composite material, where a composite material means a plastic or polymer matrix with a filler, such as a fiberglass, ceramic material or polymer fiber.

A beam-forming layer assembly 702 is spaced apart (e.g., vertically upward) from the array assembly 703, which comprises an array of antenna elements 112, by a second dielectric spacer 706, alone or in combination with second electrically conductive posts 26. For example, as illustrated in FIG. 1, the second dielectric spacer 706 may comprise a framework that has a polygonal border 756 (e.g., substantially rectangular border) with interior structural supports 757, where the polygonal border 756 (e.g., rectangular border) has vertical bores or (substantially cylindrical) recesses 758 to receive, accept or retain posts, sleeves (26), fasteners, substantially polygonal, or substantially cylindrical members. The second dielectric spacer 706 may be composed of a plastic, a polymer, or a composite material, where a composite material means a plastic or polymer matrix with a filler, such as a fiberglass, ceramic material, or polymer fiber.

In FIG. 3, the beam-forming layer assembly 702 has a set of electrically conductive beam-forming antenna elements 16 overlying a secondary dielectric substrate 19.

Figure 4A:
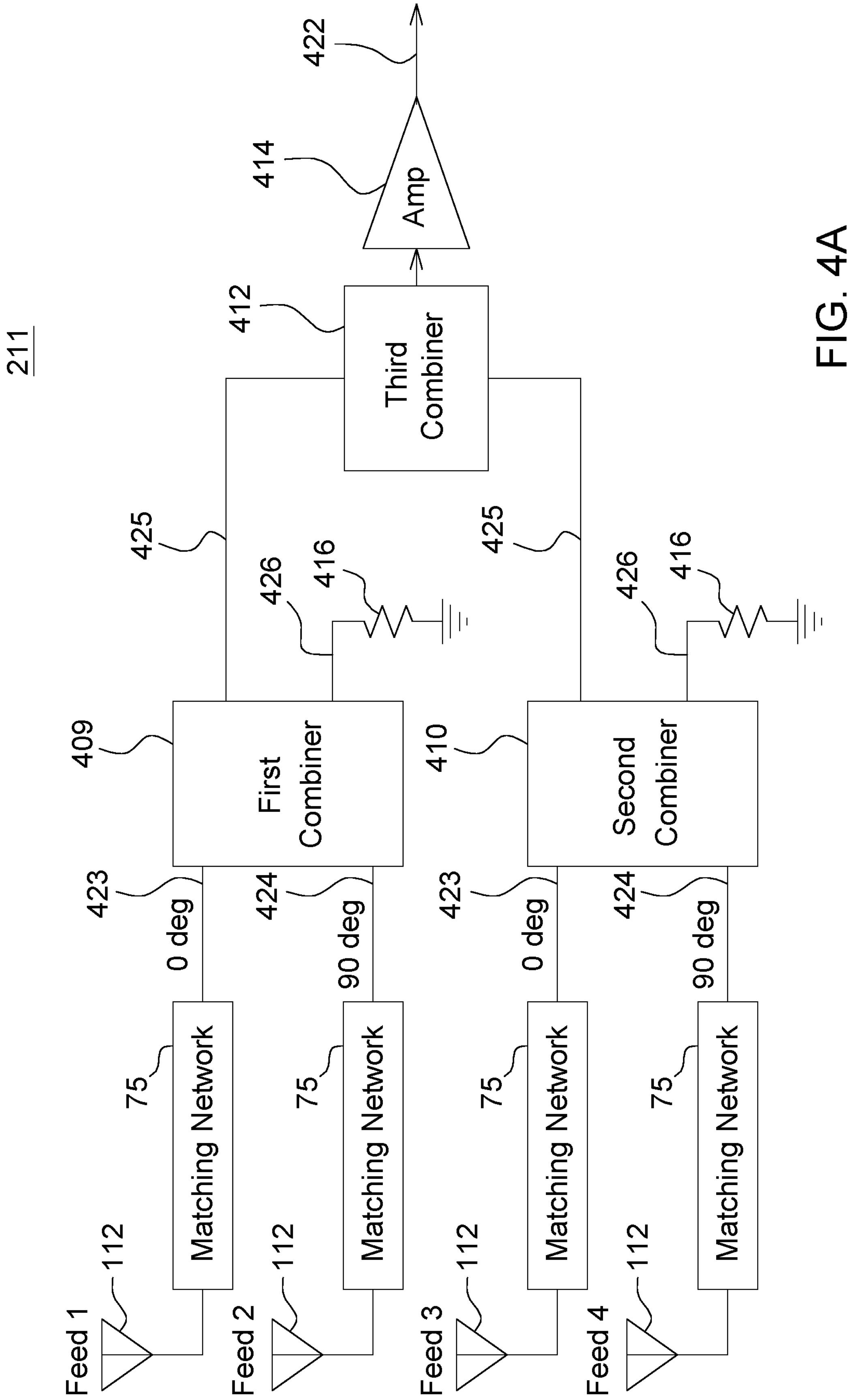
FIG. 4A is a block diagram of a first embodiment of a signal combining network for the antenna system of FIG. 1.
Figure 4B:
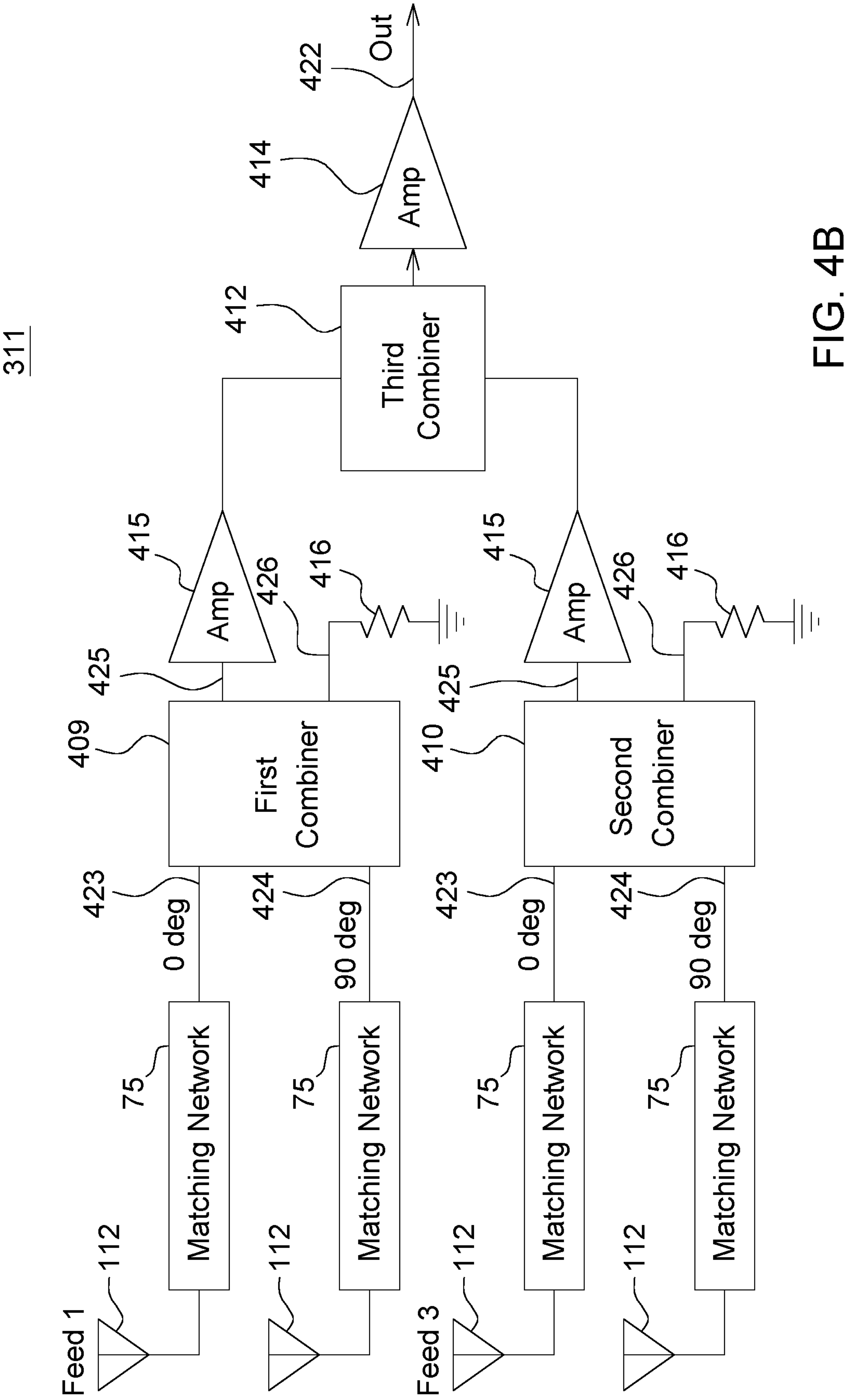
FIG. 4B is a block diagram of a second embodiment of a signal combining network for the antenna system of FIG. 1.
Figure 4C:
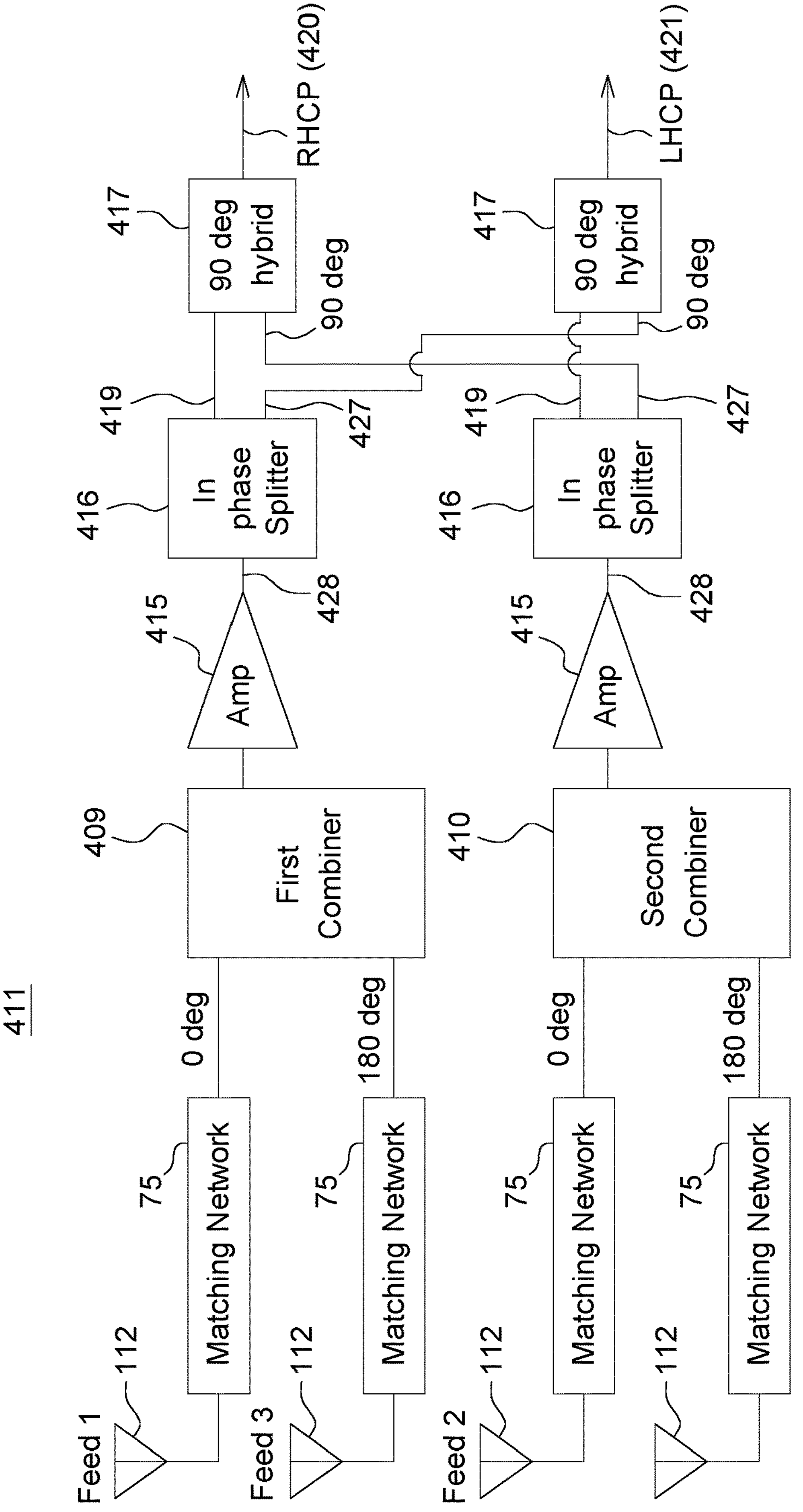
FIG. 4C is a block diagram of a third embodiment of a signal combining network for the antenna system of FIG. 1.

In FIG. 4A, FIG. 4B, or FIG. 4C, a combining network (211, 311, 411) is configured for combining the received electromagnetic signal components from the array of antenna elements 112, wherein the combining network (211, 311, 411) cooperates to yield or receive a (target) radiation pattern (i.e., an aggregate radiation pattern in the far field, which is suitable for reception of electromagnetic signals) that is generally circularly polarized at the target wavelength range. Further, the combining network (211, 311, 411) may be formed, mounted or integrated into the ground plane assembly 704, or a circuit board of the ground plane assembly 704.

In one embodiment, the ground plane assembly 704 comprises a circuit board with a first side 751 and second side 752 opposite the first side, where the circuit board comprises a dielectric substrate and conductive traces on the first side 751, the second side 752, or both. For example, on a first side 751 (e.g., an upper side facing the antenna elements 112) an electrically conductive, metal ground plane overlies at least a portion of the first side 751: on the second side 752 (e.g., a lower side) of the ground plane assembly has, incorporates, supports, or defines the circuitry of the combining network (211, 311, 411). For example, the second side 752 of the circuit board may comprise conductive traces that provide electrical connections to the form circuitry of the combining network (211, 311, 411).

Referring to the array assembly 703 (e.g., radiating layer assembly) of FIG. 2, each metallic antenna element 112 has an individual primary perimeter 33, which means an individual primary outline, region of footprint of the respective antenna element 112. Collectively, the array of antenna elements 112 has a primary perimeter 33 (e.g., aggregate primary perimeter) which refers to the aggregate or collective primary outline, region or footprint of the complete array of metallic antenna elements 112, where each antenna element 112 is separated from adjacent antenna elements 112 by an intermediate dielectric region 35 or isolating dielectric region of the substrate 14.

In one embodiment, the ground plane assembly 704 may comprise metal foil or a metallic ground layer that overlies a dielectric substrate, such as a first side 751 of the circuit board of the ground plane assembly 704. For example, in some embodiments, a metallic ground layer and the dielectric substrate collectively define a circuit board of the ground plane assembly 704. Further, the ground plane assembly 704 comprises a metallic layer that extends radially outward with respect to a central vertical axis 23 about the same extent as an outermost perimeter of the array assembly 703 extends radially outward from the central vertical axis 23. As used throughout this document, substantially, generally or about means a tolerance of plus or minus ten percent for any angle, dimension, characteristic, or other parameter, unless otherwise explicitly stated.

In an alternate embodiment, the ground plane assembly 704 may comprise a substantially planar sheet metal ground plane that is separate from a circuit board associated with the circuitry of the combining network (211, 311, 411).

As best illustrated in FIG. 1 through FIG. 3, inclusive, the beam-forming layer 702 is stacked above (and vertically separated from) the array assembly 703 (of antenna elements 112) along a central vertical axis 23. In FIG. 3, each conductive beam-forming antenna element 16 has a secondary perimeter 37, which refers to a secondary outline, region or footprint of the conductive beam-forming antenna element 16, where each antenna element 16 is separated from adjacent antenna elements 16 by an intermediate dielectric region 39 or isolating dielectric region of the substrate 19.

In one embodiment, an outermost radial extent (of the secondary perimeter 37) of one or more conductive beam-forming elements 16 (of the beam-forming layer 702) are generally aligned (e.g., radially aligned by an imaginary or virtual vertical projecting line, curved surface or plane) with a primary perimeter 33 (e.g., individual primary perimeter or collective primary perimeter) of the array of metallic antenna elements 112 (of the array assembly 703), where the primary perimeter 33 and the secondary perimeter 37 extend radially outward from a central vertical axis 23 (e.g., to substantially the same radial extent from the central vertical axis 23). For example, radial alignment (e.g. perimeter alignment) of the primary perimeter 33 (of the array assembly 703) and the secondary perimeter 37 (of the beam-forming layer 702) means one or more of the following: (a) radially aligned with respect to a central vertical axis 23, or (b) radially aligned and axially (e.g., vertically) separated with respect to the array assembly 703 (or its array of metallic antenna elements 112) and the conductive beam-forming layer 702 (or its beam-forming elements 16).

In one configuration, as illustrated in FIG. 2, the array assembly 703 of antenna elements 112 comprises a plurality of first metal-plated through-holes (13, 15) in the primary dielectric layer 14. Meanwhile, in FIG. 3 the beam-forming layer 702 (e.g., beam-forming assembly) has conductive beam-forming antenna elements 16 that comprise a plurality of second metal-plated through-holes 18 that are aligned (e.g. vertically) with a subset (e.g. ones) of the first metal-plated through-holes (13, 15). Further, electrically conductive posts (e.g., 24, 26, such as electrically conductive sleeves) are configured to form a mechanical and electrical connection between the first metal-plated through-holes (13, 15), in the array assembly 703, and corresponding aligned ones of second metal-plated through-holes 18, in the beam-forming layer 702. In some configurations, the first and second metal-plated through-holes (13, 15, 18) may comprise inner holes that are located radially proximate to the central vertical axis 23. Via the electrically conductive posts (24, 26), such as metal sleeves, an electrical connection can be formed between the array of metallic antenna elements 112 and the beam-forming antenna elements 16 (e.g., to receive signals from actively coupled beam-forming elements 16 that are actively coupled to the array of metallic elements 1). Accordingly, the metallic antenna elements 112 of the array assembly 703 are directly coupled or actively coupled to the beam-forming antenna elements 16, as opposed to merely parasitically coupled (e.g., to a parasitic reflector) to facilitate reliable reception or transmission of circularly polarized signals (e.g., even if there are possible manufacturing tolerance variations in the separation between the metallic elements 112 and the beam-forming elements 16). In other words, in some embodiments, active coupling between the metallic elements 112 and the beam-forming elements 16 can perform (e.g., receive or transmit) reliably with reduced dependence upon tolerance of the (physical, vertical) separation at a target, fractional wavelength multiple (for the operational frequency range of the antenna) between the array of metallic antenna elements 112 and the beam-forming antenna elements 16).

In one example, the electrically conductive posts (24, 26) comprise any of the following: conductive cylindrical members, hollow (substantially) cylindrical members, metallic sleeves, metallic stand-offs, metal-plated studs, metal studs, hollow (substantially) polygonal members that can receive fasteners, dielectric or metal cores plated (e.g., sputtered or electroless deposition plated) with a suitable metal or a suitable alloy. The fasteners can be embodied as: bolts, or a combination of bolts and nuts, or a combination of dielectric bolts and dielectric retainers (nylon nuts). In an alternate embodiment, each electrically conductive post (24, 26) has a first radius (or first diameter) and terminates (e.g., at opposite ends) in one or more threaded studs of a second radius (or second diameter), where the first radius is greater than the second radius.

The array of antenna elements 112 comprises first metal-plated through holes (13, 15), which may be classified as inner metallic-plated, through-holes 13 and outer metal-plated, through-holes 15. Further, electrically conductive posts (24, 26) are configured to form a mechanical and electrical connection between primary portions of the array of antenna elements 112 (e.g., first metal-plated, through-holes, 13, 15) and respective secondary portions of ground plane assembly 704 and its metal-plated through-holes in its circuit board. In some configurations, the conductive posts (24, 26) comprise electrically conductive and substantially cylindrical members, as previously described in this document.

In one embodiment, in FIG. 2 in the array assembly 703 each one of the metallic antenna elements 112 comprises an outer semi-elliptical region 12 opposite a central tapered region 312 (e.g., trapezoidal region). Further, one or more intervening notches 117 (e.g., substantially rectangular notches 117 or substantially rectangular slots) are configured to intervene between the outer semi-elliptical region 12 and the central tapered region 312. As illustrated, the notches 117 are on opposite sides of each metallic antenna element 112.

Meanwhile, in the beam-forming layer 702, the electrically conductive beam-forming elements 16 comprise a set of generally elliptical members (e.g., notched disks) having an outward facing radial notch 17 (or slot), where within the beam-forming layer 702 the electrically conductive beam-forming elements 16 are substantially coplanar. At each second metal-plated through hole 18, each beam-forming member 16 is fed from a corresponding antenna element 112 via the second electrically conductive posts 26. In some configurations, outer holes 318 in the dielectric substrate 19 (e.g., dielectric layer) can be used for (dielectric) spacers (e.g., vertical spacers), pedestals, or supports to maintain precise spacing between the stacked layers or assemblies of the antenna system 111.

In one embodiment, the antenna system 111 is enclosed or housed in an enclosure or housing that is formed by mechanically connecting a lower housing member 705 to an upper housing member 701. In one embodiment, the lower housing member 705 has a base or central area 22, where a metal or metallic, curved wall 81 extends vertically upward from a perimeter of the central area 22, and where fins 82 extend radially outward from the wall 81. Further, a ground plane assembly 704 is connected to a central region of the lower housing member 705 (e.g., via a third dielectric spacer 708 and/or a plurality of foam spacers between a central portion of the ground plane assembly 704 and an interior of the lower housing member 705). In some embodiments, the curved metallic wall 81 can create boundary conditions or support wave guidance consistent with the antenna system 111 receiving (or transmitting) circularly polarized signals.

In some embodiments, the metallic curved wall 81 has fins 82 such that the metallic antenna elements 112 (of the array) are surrounded by a finned structure, where the finned structure tends or is capable: (a) to increase a front-to-back gain ratio (i.e., reduces the gain of one or more back lobes relative to one or more front lobes) of the antenna 111 and (b) to reduce the influence (e.g., electromagnetic coupling) of structures, such as metal or conductive structures that may be underneath the antenna 111 or spaced apart from the bottom of the antenna system 111. An upper housing 701 member is connected to the lower housing member 705 via one or more fasteners 83, wherein the upper housing 701 member comprises a dielectric lid (e.g., radome) configured to enclose the beam-forming layer 702, the conductive ground plane assembly 704, and the array assembly 703.

Although the lower housing member 705 can be composed of cast aluminum, extruded aluminum or aluminum alloys, in alternate embodiments the lower housing member 705 may have a dielectric core (e.g., plateable plastic, plateable polymer or metallized ceramic member) that is plated with metal or a metallic alloy (e.g., via electroplating, electroless deposition, metal sputtering).

As mentioned, the antenna system 111 can receive or transmit substantially circularly polarized signals. In practice, a generally circularly polarized electromagnetic signal comprises a right-hand (circularly) polarized (RHCP) electromagnetic signal component and a left-hand (circularly) polarized (LHCP) electromagnetic signal component.

In FIG. 4C the combining network 411 is configured to isolate or separate the right-hand, circularly polarized electromagnetic signal (RHCP) component from the left-hand, circularly polarized (LHCP) electromagnetic signal component, or to provide an output of a circularly polarized electromagnetic signal. In some embodiments, in the array assembly 703 the shape of the metallic antenna elements 112 are symmetrical in the X-Y plane about a central vertical axis 23, such that the antenna system 111 is capable of receiving right hand circularly polarized signals, left-hand circularly polarized signals, and dual polarized circularly polarized signals. If the antenna system 111 is optimized for the reception of circularly polarized electromagnetic signals, then elliptically polarized signals or linearly polarized signals may be received by the antenna system 111 with some attenuation.

One feature of the antenna system 111 comprises a conductive ground plane assembly 704 (e.g., a substantially elliptical or circular ground plane assembly 704) with a set of (e.g., four) metallic antenna elements 112 (e.g., substantially planar antenna radiating elements) in the array assembly 703 above the conductive ground plane assembly 704. The metallic antenna elements 112 (e.g., substantially planar radiating elements) are electrically coupled to (e.g., connected to) circuitry (e.g., via matching networks 75) on (e.g., the second side 752 of) the ground plane assembly 704 via first electrically conductive posts 24. Accordingly: the first conductive posts 24 maybe electrically isolated from the surface of the conductive ground plane (on the circuit board), while such first conductive posts 24 may interface with conductive traces on one or more sides (751, 752) of the circuit board, alone or in combination with blind conductive vias, conductive vias, or conductive through-holes in dielectric substrate of the ground plane assembly to form an electrical connection to the combining network (211, 311, 411) or its (electrical or electronic) components 759, which can be incorporated on or around the second side 752 of the circuit board of the ground plane assembly 704.

In the combining network (211, 311 411), the circuitry combines (e.g., in quadrature) the four signals from the antenna elements 112 to obtain a circularly polarized receive pattern that supports reception of circularly polarized signals, left-hand polarized signals, or right-hand polarized signals, separately and cumulatively. Additionally, electrically conductive posts 26 extend upward from the antenna elements 112 (of the array assembly 703) to electrically connect to a set of (e.g., four) substantially planar beam-forming elements 16 (e.g., of a beam-forming layer 702). Each of the antenna elements 112 (e.g., radiating element) has two cylindrical members 26 near the outer edge which connect to the ground plane assembly 704 or which connect to circuit traces on the dielectric substrate of the ground plane assembly 704, where the circuit traces may be coupled to the combining network (211, 311, 411) or to impedance matching networks 75.

FIG. 1 shows an exploded view of the antenna system 111. On the lower housing member 705 is the metallic finned structure 705 which also has a (depressed or interior) central area 22, which serves as the housing for the electrical circuitry of the combining network (211, 311, 411) located on the second side 752 (e.g., lower side) of the ground plane assembly 704 (e.g., substantially elliptical ground plane assembly 704). In the array assembly 703, the conductive regions (12, 312) of the antenna elements 112 are illustrated.

The dielectric spacer 706 or dielectric framework is positioned between the array assembly 703 (e.g., radiating layer) and the beam-forming layer 702. The dielectric spacer 706 may have (substantially) cylindrical recesses 758 to retain electrically conductive posts 26 (e.g., electrically conductive hollow members). In one embodiment, to improve the axial ratio, the beam-forming layer 702 is configured to adjust the ratio of electric (E) fields in the phi ((azimuthal) radial coordinate, $\phi$) and theta ((elevational) angular coordinate, $\theta$) directions, in accordance with polar coordinates (e.g., $\theta$, $\phi$) or in accordance with spherical coordinates (r (vector r), $\theta$, $\phi$). In some configurations, the phi (radial coordinate, $\phi$) and theta (angular coordinate, $\theta$) may lie in or on a common plane and r determines the magnitude and direction of the vector in the common plane. Further, it is possible to define the above polar coordinates or spherical coordinates with reference to vertical axis 23 in FIG. 1, which can represent a Z-axis (in Cartesian coordinates) that defines the theta angle (e.g., elevation angle) between the Z-axis and r; where the X-axis is substantially orthogonal to the vertical axis 23 (Z-axis) and the phi angle (e.g., azimuth angle) is between the X-axis and common plane.

In array assembly 703, the antenna elements 112 (e.g., radiating elements with symmetrical opposing side notches 117) are implemented as metal traces, metal foil, metallic pads, or metallic islands on a dielectric substrate 14 (e.g., a circuit board or a thin-printed circuit board). For example, conventional FR-4 epoxy-glass material can be used for dielectric substrate 14, although ceramic, polymeric, plastic, composite, other dielectric substrates could be used. In some configurations, the holes in the antenna elements 112 and in the dielectric substrate 14 are first metal-plated-through holes (13, 15), such that the electrically conductive members or posts (24, 26) above and below the array assembly 703 will be mechanically and electrically connected to respective ones of the antenna elements 112.

The beamforming layer 702 is above the array assembly 703 (e.g., radiating layer). The array assembly 703 is spaced apart from the ground plane assembly 704 by a first dielectric spacer 707, alone or together with posts 24). Further, the first dielectric spacer 707 may have cylindrical recesses to hold or retain first electrically conductive posts 24 (e.g., hollow cylindrical conductive members). The array assembly 703 is spaced apart from the beam-forming layer 702 by a dielectric spacer 706 and the dielectric spacer 706 may have (substantially) cylindrical recesses 754 to hold or retain electrically conductive posts 26 (e.g., hollow cylindrical conductive members).

In one embodiment, the beam-forming layer (assembly) 702 is implemented as metal traces, metal foil, metallic pads or metallic islands to form conductive beamforming members 16 on a dielectric substrate 19 (e.g., circuit board or thin printed circuit board). Conventional FR-4 epoxy-glass material can be used, although ceramic, plastic, polymeric, or composite dielectric substrates could be used. The conductive beam-forming elements 16 can be coupled to the array assembly 703 or one or more (radiating) antenna elements 112 via conductive through-holes 18 in the dielectric substrate 19 and the conductive beam-forming elements 16.

Above the beamforming layer 702 is the upper housing member 701, which comprises a radome, a lid, or a cover for the antenna system III to protect the beam-forming layer 702, the array assembly 703, the ground plane assembly 704 and combining network (e.g., 211, 311, 411, circuitry of the ground plane assembly) from dust, debris, salt, or moisture, insects or rodents that could damage, corrode or oxidize the conductive layers, or otherwise reduce the longevity of the antenna.

FIG. 4A, FIG. 4B and FIG. 4C provide different illustrative examples of combining networks (211, 311, 411) for combining received signals from the antenna elements 112 or transmitted signals to the antenna elements 112. The signals from the four antenna elements of the antenna array 703 is provided to the combining network (211, 311, 411) via or through one or more of the following electrical paths: (a) via the first metal-plated through-hole (13, 15) in the antenna element 112 and dielectric substrate 14, (b) via one or more electrically conductive posts 26. (c) via a metal-plated through-hole, electrically conductive blind via, or electrically conductive via in the ground plane assembly 704 or in its circuit board, where the metal-plated through hole, electrically conductive blind via or electrically conductive via is electrically isolated from a ground plane on the circuit board (e.g., by a dielectric barrier region or air-gap), and (d) transmission lines, microstrip, strip-lines, coaxial cable or other signal feeds on one or more both sides of the circuit board of the ground plane assembly 704. Further, if the antenna system Ill is used for reception of satellite signals or other electromagnetic signals, the electromagnetic signals to the antenna elements 112 must be electrically combined to result in a single combined signal to be received (e.g., decoded, demodulated, or processed) by the satellite receiver. Because the received signal polarization is typically circular, in some embodiments, like FIG. 4A and FIG. 4B, the four signals are combined in four phases, each 90 degrees from the adjacent feeds; hence, the above combining system configuration of FIG. 4A and FIG. 4B is known as a quadrature combiner.

Because the (antenna) impedance of the antenna elements (e.g., impedance of antenna elements 112, beam-forming elements 16, and its or their transmission line or feed) is generally not (e.g., inherently or naturally) at a target impedance that is compatible with an input impedance of one or more combiners (e.g., first combiners 409, 410), an impedance matching circuit 75 is required for each feed to better match the antenna impedance to the target impedance. In one embodiment, the target impedance is approximately 50 ohms over the entire GNSS frequency range (e.g., frequencies near 1550 MHZ, the L1 signal, the L2 signal or the L5 GPS signal), satellite reception bandwidth, or satellite channels.

In an alternative embodiment, the target impedance is approximately 75 ohms over the entire GNSS frequency range (e.g., frequencies near 1550 MHz, the L1 signal, the L2 signal or the L5 GPS signal), satellite reception bandwidth, or satellite channels: target impedances other than approximately 50 ohms or approximately 75 ohms can fall under the scope of the appended claims.

The impedance matching network 75 comprises an impedance matching module, where the impedance matching network 75 may comprise a lumped element circuit of a network of capacitors and inductors, or a filter with a desired input and output impedances and target magnitude versus frequency response.

FIG. 4A through FIG. 4C, inclusive, discloses three possible combiner circuit configurations or topologies. The antenna system 111 (e.g., disclosed in FIG. 1 through FIG. 3) is compatible with any of the configurations of the combining circuits of FIG. 4A through FIG. 4C, inclusive.

FIG. 4A is a block diagram of a first embodiment of a combining system 211, which comprises a combining circuit or combining network. The first embodiment of the combining system 211 has a matching network 75 electrically coupled to each antenna element 112 of the array assembly 703. In one possible interpretation of FIG. 3 that can be applied to any of the combining systems (211, 311, 411), the first antenna element 112 is positioned at approximately twelve o'clock: the second antenna element 112 is positioned at approximately three o'clock; the third antenna element 112 is positioned at approximately six o'clock: and the fourth antenna element 112 is positioned at approximately nine o-clock, although the antenna elements can be labeled to associated the prefix modifiers (e.g., first, second, third and fourth antenna elements) of each antenna element 112 in accordance with other variations or permutations. As illustrated, a first antenna element 112 (e.g., together with its signal transmission path to the combining network 211 or matching network 75) is configured to be substantially or approximately in phase with a third antenna element 112 (e.g., together with its signal transmission path to the combining network 211 or matching network 75) over the frequency range of interest, whereas a second antenna element 112 (e.g., together with its signal transmission path to the combining network 211 or matching network 75) is configured to be substantially or approximately in phase with a fourth antenna element 112 (e.g., together with its signal transmission path to the combining network 211 or matching network 75) of the frequency range of interest. Meanwhile, the first antenna element 112 and the second antenna element 112 are out of phase (e.g., approximately 90 degrees out of phase with respect to each other) and the third antenna element 112 and the fourth antenna element 112 are out of phase (e.g., approximately 90) degrees out of phase) with respect to each other over the frequency range of interest. For example, the signal transmission path between antenna elements 112 and the combining system 211 (or matching network 75) may include the first electrically conductive posts 24 and first metal-plated through-holes (13, 15) of the antenna assembly 703 and the through-holes of the ground plane assembly 704.

In FIG. 4A, the first antenna element 112 and the second antenna element 112 are coupled to input ports (423, 424) of a first combiner 409, whereas a third antenna element 112 and a fourth antenna element 112 are coupled to input ports (423, 424) of the second combiner 410. Here, a combiner, such as the first combiner 409 and the second combiner 410, may be structured as a 90 degree hybrid combiner with two input ports (423, 424) that are configured for or tuned to a corresponding frequency band. The hybrid combiner (409, 410) can form the sum of the two input signals at the output port 425 of the combiner (409, 410). An extra output port 426 has a terminating load resistor to balance the impedance of the hybrid combiner (409, 410): where in some embodiments the extra output port 426 provides an isolated port or a difference between the two input signals.

In FIG. 4A, the first embodiment of the combining system 211 comprises a combining circuit or combining network that uses a first combiner 409 and a second combiner 410 that is followed by a third combiner 412. For example, the first combiner 409 comprises a 90 degree hybrid combiner: the second combiner 410 comprises a 90 degree hybrid combiner: and the third combiner 412 comprises a 180 degree hybrid combiner (e.g., 180 degree rat-race combiner).

Any combiner (409, 410, 412, 417) can be implemented using microstrip transmission line (e.g., known as the rat race combiner), stripline transmission line, and/or as a discrete component (e.g., surface mount component). Each combiner (409, 410, 412, 417), such as a 90 degree hybrid combiner or 180 degree hybrid combiner, is available as a discrete component or surface-mountable component for installation on a circuit board. For example, the hybrid combiner can be mounted on the circuit board of the ground plane assembly or fabricated as microstrip or stripline on the circuit board of the ground plane assembly 704.

For a combiner, the microstrip implementation has lower insertion loss than the surface mount component hybrid. However, fabricating a microstrip implementation of a combiner directly on the circuit board can use considerable circuit board area. Instead, the hybrid combiner may be configured as a commercially available, separate, compact, discrete component with a readily known package size for a given frequency range.

At the operational frequency or frequency band of interest, the hybrid combiner (e.g., 409, 410, 412, 417) may be configured to provide a quarter-wavelength delay line between any two adjacent ports of the hybrid combiner (e.g., 409, 410). In some configurations, the hybrid combiner can work bidirectionally for transmit or receive signals. In other configurations, the combiner (e.g., hybrid combiner) may comprise a ferrite device that has an output isolator port that only supports a unidirectional signal or combining of signals in one direction.

In FIG. 4A after the passive combining circuits of the first combiner 409 and the second combiner 410 (in the first stage of combining received signals) and a third combiner 412 (in the second stage of combining received signals), an amplifier 414 (e.g., low-noise amplifier (LNA)) is coupled to the output of the third combiner 412. The amplifier 414 can establish a target system noise figure and associated gain to boost the receive signal to a level appropriate for the receiver (e.g., GNSS receiver) or an antenna port of the receiver.

FIG. 4B is a block diagram of a second embodiment of a combining circuit 311 that comprises a combining circuit or combining network. The combining system of FIG. 4B is similar to the combining system of FIG. 4A, except the combining system of FIG. 4B further includes a first amplifier 415 and a second amplifier 415 that are coupled between a first stage and a second stage of the combiners (409, 410, 412). Like reference numbers in FIG. 4A and FIG. 4B indicate like features or elements.

In FIG. 4B, the combining system 311 has a first amplifier 415 coupled to an output port 425 of the first combiner 409: a second amplifier 415 coupled to an output port 425 of the second combiner 410. The combining system 311 of FIG. 4B provides more flexibility in the design choice of the third combiner 412 (e.g., 180 degree combiner) than the combining system 211 of FIG. 4A. Because of the gain(s) of the first amplifier 415 and the second amplifier 415 are applied prior to the third combiner 412, the noise-figure contribution (e.g., to the received signal) of the third combiner 412 is reduced: hence, sensitivity to received signals can be improved subject to signal propagation in the field. Further, the insertion loss of the third combiner 412 does not materially affect performance of the combining system 311: hence, it is possible to select a third combiner 412 with a greater insertion loss than otherwise possible without the first amplifier 415 and second amplifier 415. Also, the isolation inherent in the first amplifier 415 and the second amplifier 415 are advantageously configured to isolate the two combiner inputs of the third combiner 412, thereby reducing the isolation requirement for the third combiner 412 itself. Here, the output port 422 may provide a right-hand, circularly polarized (RHCP) signal or a circularly polarized signal, for instance, although the antenna (of antenna system 111), alone or together with the combining system 311 may be configured to receive or output a left-hand, circularly polarized (LHCP), a RHCP, or both, or other polarized signals (e.g., elliptically polarized signals).

FIG. 4C is a block diagram of a third embodiment of a combining system 411 comprises a combining circuit or combining network that is configured to provide two receive signal outputs from the antenna system 111: a first received signal output port for substantially right-hand circularly polarized (RHCP) signal components and a second received signal output port for substantially left-hand circularly polarized (LHCP) signal components.

The third embodiment of the combining system 411 has a matching network 75 electrically coupled to each antenna element 112 of the array assembly 703. As illustrated in FIG. 4C, a first antenna element 112 is configured to be substantially or approximately in phase with a second antenna element 112 (e.g., at the frequency range of interest), whereas a third antenna element 112 is configured to be substantially or approximately in phase with a fourth antenna element 112 (e.g., at the frequency range of interest). Meanwhile, the first antenna element 112 and the third antenna element 112 are out of phase (e.g., approximately 180) degrees out of phase with respect to each other at the frequency range of interest) and the second antenna element 112 and the fourth antenna element 112 are out of phase with respect to each other (e.g., approximately 180 degrees out of phase at the frequency range of interest).

In FIG. 4C, the first antenna element 112 and the third antenna element 112 are coupled to input ports of a first combiner 409, whereas a second antenna element 112 and a fourth antenna element 112 are coupled to input ports of the second combiner 410. At the input terminals of the first and second combiners (409, 410), representative input phases (e.g., approximately in-phase, such as approximately zero degrees: approximately out of phase, or approximately one-hundred and eighty degrees) for the corresponding input signals are illustrated. For example, the (signal) feed path or signal transmission path between antenna elements 112 and the combining system 211 (or matching network 75) may include the first electrically conductive posts 24 and metal-plated through-holes of the antenna assembly 703 and the through-holes of the ground plane assembly 704.

Here in FIG. 4C, the combiner, such as the first combiner 409, the second combiner 410, may be structured as a 180 degree hybrid ring combiner (e.g., rate race combiner) with two input ports that are configured or tuned to a corresponding frequency range of interest (e.g., frequency band). The combiner (e.g., hybrid combiner) can form the sum of two input signals at the output port. An optional extra output port (not shown) has a terminating load resistor to balance the impedance of the hybrid combiner: where the optional extra output port provides a difference between the two input signals.

A combiner (409, 410, 417) can be implemented using microstrip transmission line (e.g., known as the rat race combiner), stripline transmission line, and/or as a discrete component (e.g., surface mount component). In FIG. 4C, each combiner, such as a 90 degree hybrid combiner (e.g. 417) or (180 degree) hybrid combiner (e.g., 409, 410), is available as a discrete component or surface-mountable component for installation on a circuit board. For example, the hybrid combiner can be mounted on the circuit board of the ground plane assembly or fabricated as microstrip or stripline on the circuit board of the ground plane assembly 704.

For any combiner (e.g., 409, 410, 417), the microstrip implementation tends to have a lower insertion loss than the surface-mount component hybrid. However, fabricating a microstrip implementation of the combiner directly on the circuit board can use considerable circuit board area. Instead, the hybrid combiner may be configured as a commercially available, separate, compact, discrete component with a readily known package size for a given frequency range.

As illustrated in FIG. 4C, a first stage (409, 410) of the combining system 411 has a first combiner 409 and a second combiner 410. Each of the first combiner 409 and the second combiner 410 comprises a 180 degree combiner (e.g., rat race combiner). The output of the first combiner 409 is coupled to a first amplifier 415, whereas the output of the second combiner 410) is coupled to a second amplifier 415. In some configurations, each one of the first amplifier 415 and the second amplifier 415 comprises a low-noise amplifier (LNA).

The output of the first amplifier 415 is coupled to a first signal splitter 416 (e.g., in-phase splitter). Meanwhile the output of the second amplifier 415 is coupled to a second signal splitter 416 (e.g., in-phase splitter). The first amplifier 415 drives a two-way, in-phase power splitter and the second amplifier 415 drives a two-way in-phase power splitter. Each splitter 416 could be configured as a Wilkenson splitter, for instance. In the splitter 416, a first signal (propagation) delay between the input port 428 (of the splitter 416) and the first output port 419 (of the splitter 416) is substantially equal to a second signal (propagation) delay between the input port 428 and the second output port 427.

From each splitter 416, a first output terminal is coupled to an input of a first hybrid combiner 417 (e.g., 90 degree hybrid combiner) and a second output terminal is coupled to an input of a second hybrid combiner 417. In the second stage of combining, the first hybrid combiner 417 is configured to provide a first received signal output port 420 for substantially right-hand circularly polarized (RHCP) signal components and a second hybrid combiner 417 is configured to provide second received signal output port 421 for substantially left-hand circularly polarized (LHCP) signal components. With some applications, it would be desirable to receive both left-hand circularly polarized (LHCP) and right-hand circularly polarized (RHCP) with the same antenna simultaneously. Because of its symmetry, this antenna system 111 does receive both polarizations equally well. It is up to the combining circuit to favor one polarization direction and exclude the other. With a small quantity of additional circuit elements it is possible to have two outputs of the combining circuit, one for each polarization.

In one embodiment, the antenna elements 112 are not exactly 50 ohm impedance over the frequency range of interest or operational frequency range. Accordingly, inserting an impedance matching network 75 between each antenna feed (e.g., transmission line) and the respective combining system (211, 311, 411) can improve the overall antenna performance of the antenna system 111. Such impedance matching networks 75 are typically made from discrete inductors and capacitors arranged as series and shunt elements. For an impedance matching network 75, one possible circuit comprises two capacitors and two resistors is shown in FIG. 4D.

Figure 4D:
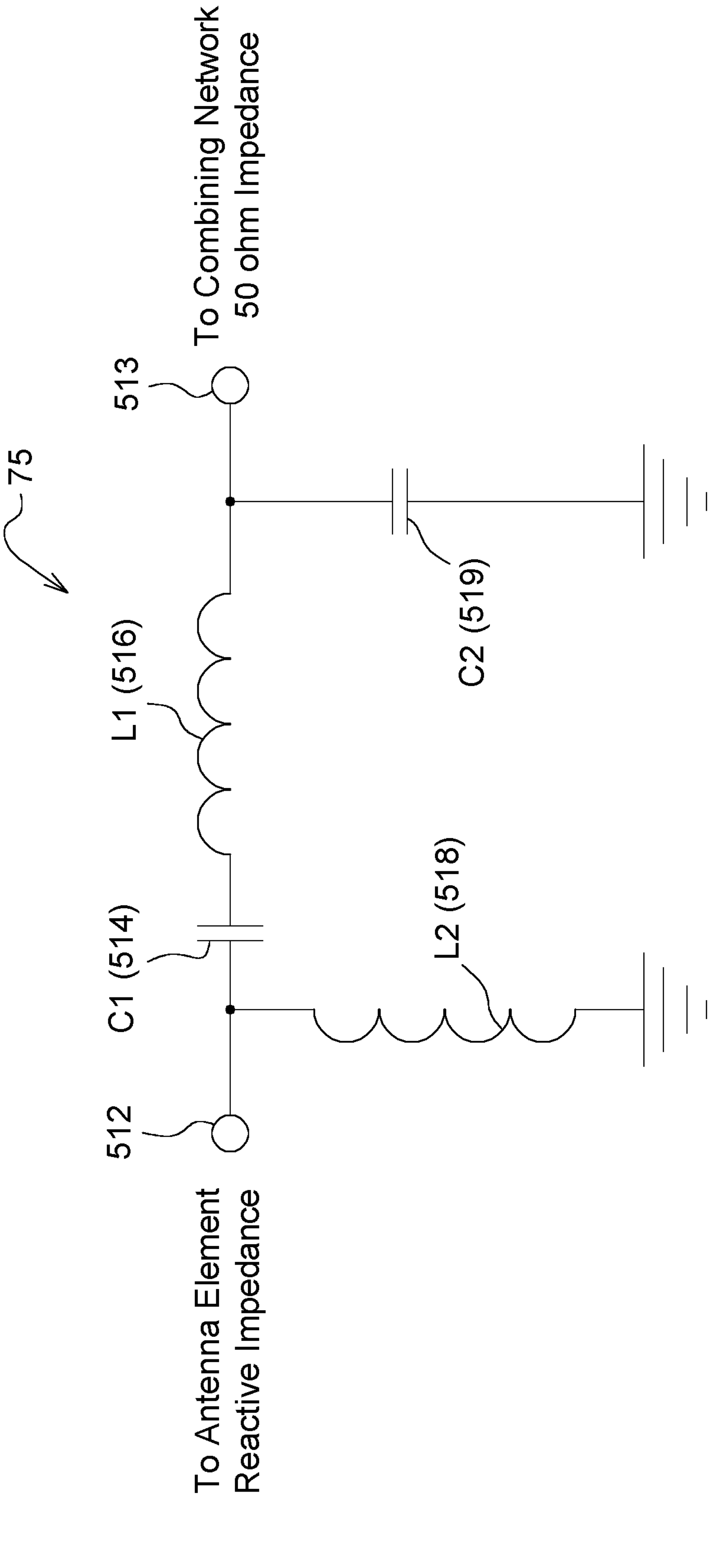
FIG. 4D is a schematic of an impedance matching network for the antenna system of FIG. 1.

As illustrated in FIG. 4D, the impedance matching network 75 comprises two capacitors (514, 519) and two inductors (516, 518), although other topologies or configurations are possible. In one embodiment, if inductor L1 (516) and capacitor C1 (514) are configured with values of capacitance and inductance as tuned circuit, the tuned circuit can provide a passband over a resonant frequency band (e.g., for the operational frequency range of interest within a half-power bandwidth of the filter's magnitude versus frequency response). Meanwhile, the capacitor C2 (e.g., C2) can act at a low pass filter. Inductor L2 (518) has an input reactance and capacitor C2 (519) has an output reactance consistent with different impedances at the input 512 (e.g., to antenna element) and the output 513 (e.g., to the combining network).

In the ideal case each antenna feed (e.g., transmission line) would have a resistive impedance of 50 ohms and no reactive impedance for the entire operating frequency range. Further, the four antenna feeds (e.g., transmission lines to the antenna elements 112) in the antenna system 111 are susceptible to coupling between or among two or more antenna feeds, which affects the antenna impedance when two or more feeds are driven in quadrature. In practice, the inter-feed coupling can be estimated or measured as a reactance error component to be compensated for. Hence, the reactance error component defines the impedance matching network 75 or informs the selection of values for one or more capacitors (514, 519) and inductors (516, 518) in the impedance matching network 75 correct the simple isolated feed impedance to produce what is known as the passive impedance. The active impedance is obtained when the other three antenna elements 112 are driven in quadrature, thereby affecting the impedance of the element under consideration. In practice all four elements will have the same impedance due to the symmetry of this antenna. The goal for the matching network is to match the active impedance to 50 ohms, while compensating for the reactance error component.

Figure 5:
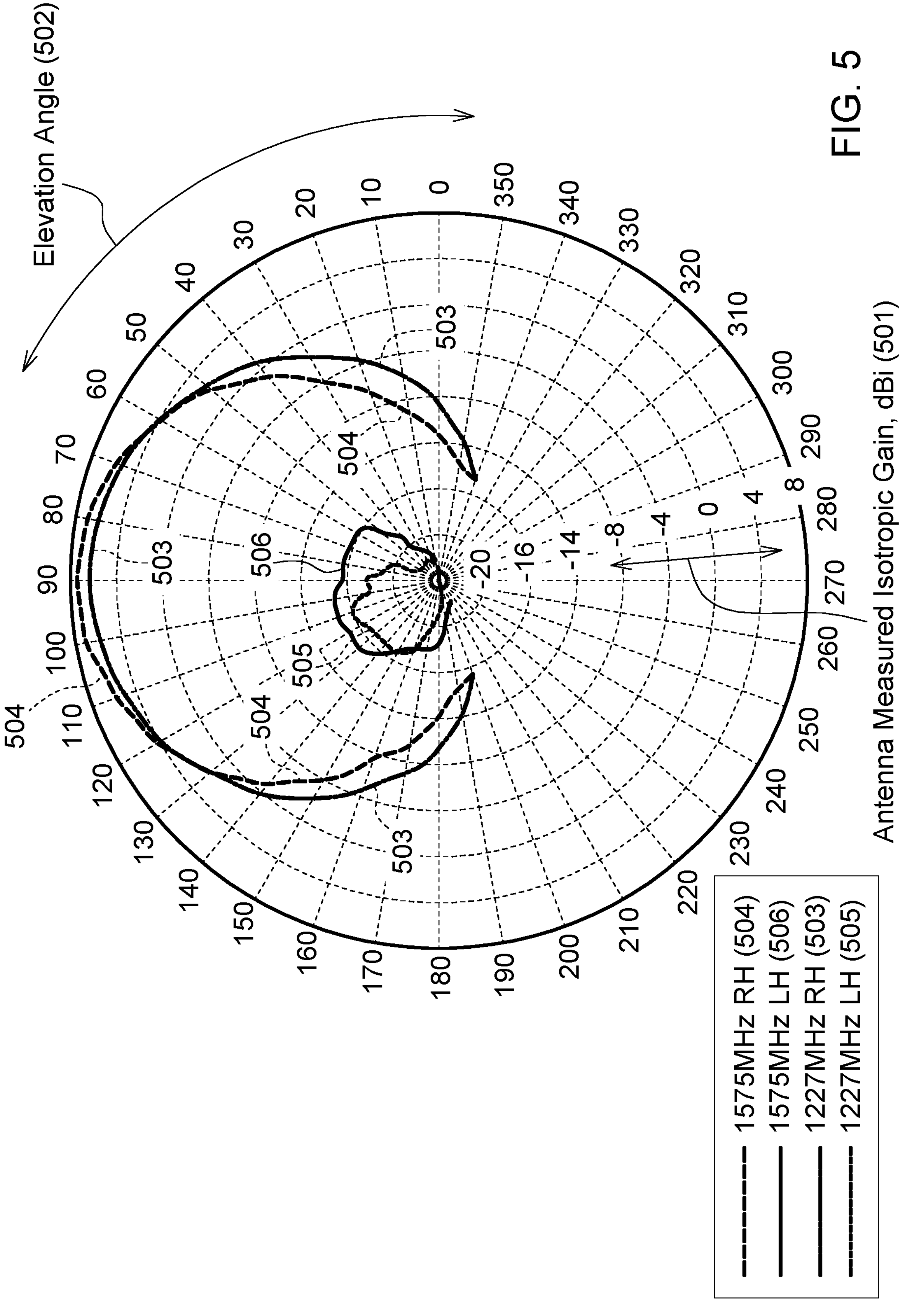
FIG. 5 is a chart of isotropic gain versus elevation angle at single representative azimuth angle for an illustrative embodiment of the antenna system of FIG. 1.

FIG. 5 is a radiation pattern chart of isotropic gain versus elevation angle (e.g., in the vertical plane) for a reference azimuth angle (e.g., a single sample, a set of averaged samples, or reference angle in the horizontal reference plane) for an illustrative embodiment of the antenna system of FIG. 1. The azimuth angle can represent the angular difference between a horizontal reference direction (e.g., sometimes North) and a horizontal angle (e.g., projected horizontal angle from a reference measurement antenna in space) of interest in a horizontal reference plane. In the vertical reference plane, the elevation angle represents the (altitude) angle relative to the horizontal reference plane.

For a GNSS application, the antenna system 111 can be configured to have generally omni-directional radiation pattern or reception pattern in the horizontal plane or with respect to the azimuth. However, in an alternate embodiment or for a fixed reference station of a GNSS network, it is possible that the radiation pattern of the antenna produces a generally cardioid radiation pattern in the vertical reference plane, in the horizontal reference plane, or both the vertical reference plane and the horizontal reference plane.

For typically GNSS applications in practice, the antenna system 111 is configured to favor or prefer reception of right-handed circularly polarized (RHCP) signals over left-handed circularly polarized signals (LHCP), which yields marked differences in gain between the RHCP and LHCP signals.

In FIG. 5, the radiation gain pattern of FIG. 5 can be derived from signal strength measurements in an anechoic chamber (e.g., using a dual-axis positioner to control a measurement angles (e.g., azimuth angle and elevation angle) of a reference (measurement) antenna with respect to the observed antenna system 111). The above RHCP and LHCP gain versus elevation patterns taken at a single azimuth angle and at two frequencies relevant to GNSS. 1227 MHz and 1575 MHz.

In FIG. 5, a first plot 504 illustrates the right-hand, circularly polarized (RHCP) gain 501 versus elevation angle 502 (in a vertical reference plane) at a first frequency range (e.g., 1575 MHz) and at a reference azimuth angle (e.g., fixed representative sample azimuth angle), where the first plot 504 is shown as a curve in long dashed lines. A second plot 506 illustrates the left-hand, circularly polarized (LHCP) gain 501 versus elevation angle 502 (in a vertical reference plane) at a first frequency range (e.g., 1575 MHz) and at a reference azimuth angle (e.g., fixed representative sample azimuth angle), where the second plot 506 is shown as solid curved line. A third plot 503 illustrates the right-hand circularly polarized (RHCP) gain 501 versus elevation angle 502 (in the vertical reference plane) at second frequency range (e.g., 1227 MHz) and at a reference azimuth angle (e.g., fixed representative sample azimuth angle), where the third plot 503 is shown as alternating long dashed lines and dots. A fourth plot 505 illustrates the left-hand circularly-polarized (LHCP) gain 501 versus elevation angle 502 (in the vertical reference plane) at a second frequency range (e.g., 1227 MHz) and at a reference azimuth angle (e.g., fixed representative sample azimuth angle), where the fourth plot 505 is shown as short-dashed lines.

Figure 6:
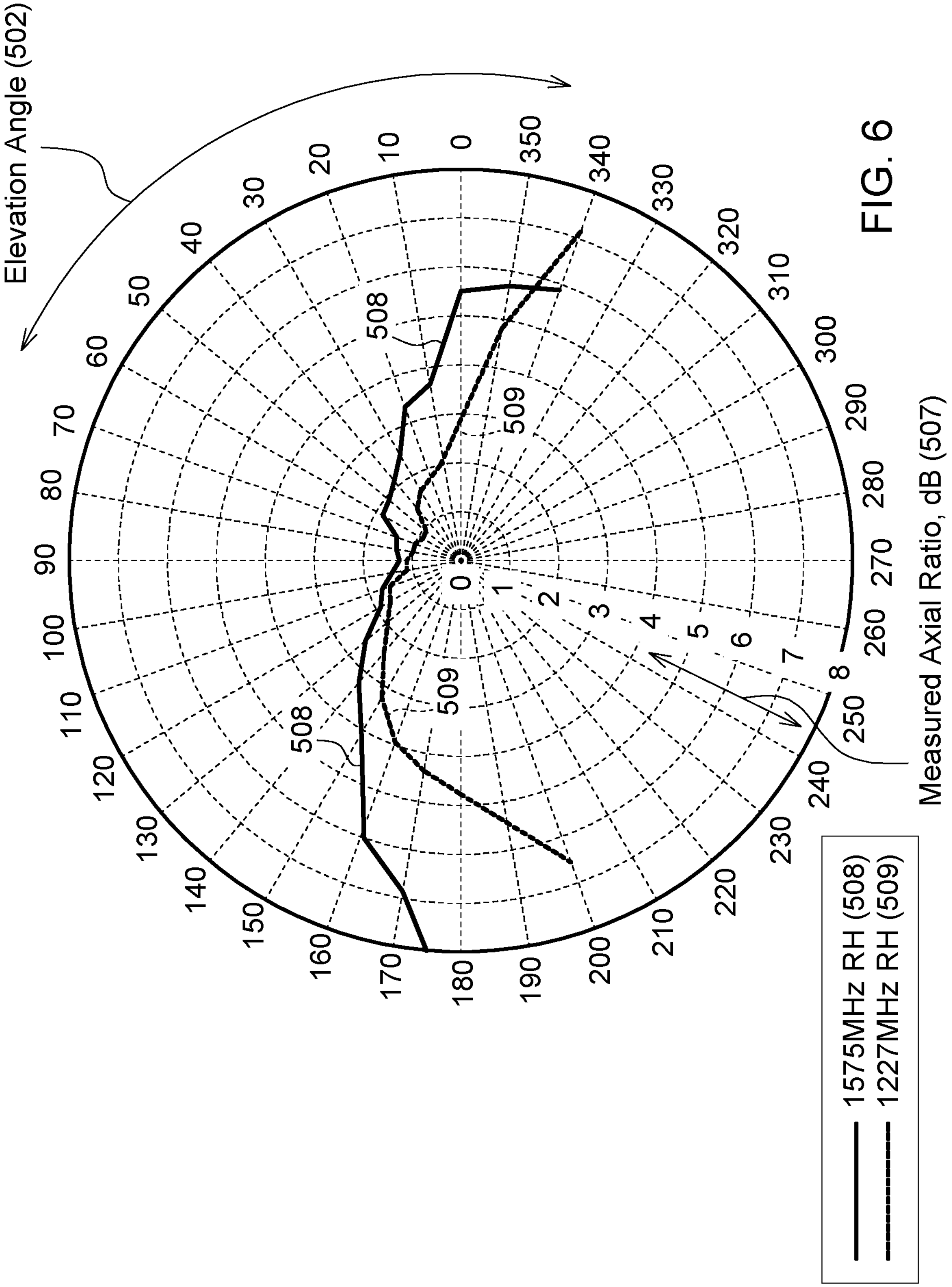
FIG. 6 is a chart of axial ratio versus elevation angle for an illustrative embodiment of the antenna system of FIG. 1.

FIG. 6 illustrates charts of axial ratio (AR) 507 versus elevation angle 502 at a representative azimuth angle (e.g., fixed representative sample azimuth angle) for an illustrative embodiment of the antenna system of FIG. 1. AR charts or plots (508, 509) are shown at different frequencies (e.g., 1575 MHz and 1275 MHz) for right-hand circularly polarized signals. The chart of FIG. 6 can be derived from the same data used to construct the gain radiation pattern of FIG. 5.

Axial ratio (AR) can be defined as the ratio of the major axis to the minor axis of a polarization ellipse. The length or magnitude of the major axis or minor axis may represent the field strength of the electric field vector (e.g., elliptical or circular electric field) which varies (e.g., rotates) over time. The perfect AR for circularly polarized signal has a value of 1 for, or 0 dB. A very high value of AR means that the antenna is better at receiving or transmitting linear polarization than at receiving or transmitting circular polarization.

AR can be used as a measure of how effective an antenna is at accepting its preferred polarization (e.g., in the current example, RHCP) and rejecting the opposite polarization (e.g., in the current example, LHCP). For example, AR can be defined in accordance with the following equation:

$$AR = \frac{|Erh| + |Elh|}{||Erh| - |Elh||},$$

where Erh is the right-hand polarized electric field, Elh is the left-hand polarized electric field and || is absolute value. For the present antenna system, in the example of FIG. 6 the AR at 10 degrees of elevation above the horizon does not exceed a maximum design threshold (e.g., approximately 7 dB), indicating adequate response to RHCP. In one embodiment, to improve the axial ratio the beam-forming layer 702 adjusts the ratio of electric (E) fields in the phi (radial coordinate, $\phi$) and theta (angular coordinate, $\theta$) directions, in accordance with polar coordinates.

The present antenna system is well-suited for use in conjunction with high-precision GNSS receivers which benefit from antenna having with one or more of the following features: (a) a suitable axial ratio (AR) for RHCP and circularly polarized signals, (b) compact size (especially height) that is consistent with mounting an off-road vehicle, (c) high front-to-back (isotropic) gain ratio to reduce the potential impact of electromagnetic noise and electromagnetic interference of vehicle electronics, electric motors, inverters and switching devices, and (d) readily manufactured with conventional circuit board manufacturing techniques in some embodiments.

The radiating antenna elements 112 (e.g., radiating disks) are positioned below a beamforming layer (of the present disclosure), which comprises a set (e.g., of four) of substantially coplanar disks 16 (e.g., notched disks) or substantially coplanar beamforming elements. Together, the antenna elements 112 and the beamforming elements 16 comprise stacked antenna element assembly. The beam-forming layer 702, or its substantially coplanar beam-forming elements 16, are electrically (e.g., electromagnetically) connected to the array assembly 703 via one or more feeds (e.g., transmission lines or conductive posts 26), which is typically below the beam-forming layer 702.

Depending upon the collective configuration of the antenna system 111 and its combining system (211, 311, 411), antenna is well suited to receive or transmit signals with right-hand (circular) polarization, left hand (circular) polarization, circular polarization, elliptical polarization, or with one or more polarizations (e.g., at least partially because the shape of the antenna elements 112 have symmetry about the X axis and the Y axis of the antenna that are generally perpendicular to the vertical axis 23, or Z axis). Further, in the radiating layer 703, the antenna elements 112 are surrounded by a finned structure which potentially increases the front-to-back gain ratio and tends to reduce or ameliorate the influence (e.g., electromagnetic coupling) of structures (e.g., metal or conductive structures) which may be underneath the antenna or spaced apart from the bottom of the antenna.

While the disclosure has been illustrated and described in detail in the drawings and foregoing description, such illustration and description are to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. An antenna system comprising:

an array of metallic antenna elements for radiating or receiving generally circularly polarized electromagnetic signal components within a target wavelength range, each antenna element within the array oriented substantially coplanar with respect to the other antenna elements, the array overlying a primary dielectric substrate;

a ground plane layer spaced apart from the array of antenna elements by a first dielectric spacer;

a beam-forming layer spaced apart from the array of antenna elements by a second dielectric spacer, the beam-forming layer having a set of electrically conductive beam-forming antenna elements overlying a secondary dielectric substrate; and a combining network for combining the received electromagnetic signal components from the array, wherein the combining network cooperates to yield or receive a radiation pattern that is generally circularly polarized at the target wavelength range, wherein each one of the metallic antenna elements comprises an outer semi-elliptical region opposite a central tapered region.

2. The antenna system according to claim 1 wherein the ground plane comprises a metallic layer that extends radially outward with respect to a central vertical axis to substantially the same extent as an outermost perimeter of the array extends radially outward from the central vertical axis.

3. The antenna system according to claim 1 wherein the beam-forming layer is stacked above the array along a central vertical axis.

4. The antenna system according to claim 3 wherein a secondary perimeter of the conductive beam-forming antenna elements is aligned with a primary perimeter of the array of metallic antenna elements, where the primary perimeter and the secondary perimeter extend radially outward from a central vertical axis.

5. The antenna system according to claim 1 wherein the array of antenna elements comprises first metal-plated through holes and wherein the ground plane comprises outer holes, with respect to the central vertical axis, that are aligned with the first metal-plated through-holes; and further comprising:

a plurality of conductive members configured to form a mechanical and electrical connection between primary portions of the array of antenna elements and respective secondary portions or circuitry of ground plane.

6. The antenna system according to claim 5 wherein the conductive members comprise conductive cylindrical members.

7. The antenna system according to claim 1 wherein one or more intervening notches are configured to intervene between the outer semi-elliptical region and the central tapered region.

8. The antenna system according to claim 1 wherein the generally circularly polarized electromagnetic signal comprises a right-hand polarized electromagnetic signal component and a left-hand polarized electromagnetic signal component.

9. The antenna system according to claim 8 wherein the combining network is configured to isolate or separate the right-hand polarized electromagnetic signal component from the left-hand polarized electromagnetic signal component.

10. The antenna system according to claim 8 wherein shape of the metallic antenna elements are symmetrical in the X-Y plane about a central vertical axis.

11. An antenna system comprising:

an array of metallic antenna elements for radiating or receiving generally circularly polarized electromagnetic signal components within a target wavelength range, each antenna element within the array oriented substantially coplanar with respect to the other antenna elements, the array overlying a primary dielectric substrate, wherein the array of antenna elements includes a plurality of first metal-plated through-holes in the primary dielectric substrate;

a ground plane layer spaced apart from the array of antenna elements by a first dielectric spacer;

a beam-forming layer spaced apart from the array of antenna elements by a second dielectric spacer, the beam-forming layer having a set of electrically conductive beam-forming antenna elements overlying a secondary dielectric substrate, wherein the set of electrically conductive beam-forming antenna elements include a plurality of second metal-plated through-holes that are aligned with the first metal-plated through-holes;

a combining network for combining the received electromagnetic signal components from the array, wherein the combining network cooperates to yield or receive a radiation pattern that is generally circularly polarized at the target wavelength range; and a plurality of electrically conductive members configured to form a mechanical and electrical connection between the first metal-plated through-holes and second metal-plated through-holes, where the first and second metal-plated through-holes comprise inner holes that are located radially proximate to the central vertical axis.

12. The antenna system according to claim 11 wherein the ground plane comprises a metallic layer that extends radially outward with respect to a central vertical axis to substantially the same extent as an outermost perimeter of the array extends radially outward from the central vertical axis.

13. The antenna system according to claim 11 wherein the conductive members comprise conductive cylindrical members.

14. An antenna system comprising:

an array of metallic antenna elements for radiating or receiving generally circularly polarized electromagnetic signal components within a target wavelength range, each antenna element within the array oriented substantially coplanar with respect to the other antenna elements, the array overlying a primary dielectric substrate;

a ground plane layer spaced apart from the array of antenna elements by a first dielectric spacer;

a beam-forming layer spaced apart from the array of antenna elements by a second dielectric spacer, the beam-forming layer having a set of electrically conductive beam-forming antenna elements overlying a secondary dielectric substrate, wherein the electrically conductive beam-forming elements comprise a set of generally elliptical members having an outward facing radial notch, wherein the electrically conductive beam forming members are substantially coplanar; and a combining network for combining the received electromagnetic signal components from the array, wherein the combining network cooperates to yield or receive a radiation pattern that is generally circularly polarized at the target wavelength range.

15. The antenna system according to claim 14 wherein the ground plane comprises a metallic layer that extends radially outward with respect to a central vertical axis to substantially the same extent as an outermost perimeter of the array extends radially outward from the central vertical axis.

16. An antenna system comprising:

an array of metallic antenna elements for radiating or receiving generally circularly polarized electromagnetic signal components within a target wavelength range, each antenna element within the array oriented substantially coplanar with respect to the other antenna elements, the array overlying a primary dielectric substrate;

a ground plane layer spaced apart from the array of antenna elements by a first dielectric spacer;

a beam-forming layer spaced apart from the array of antenna elements by a second dielectric spacer, the beam-forming layer having a set of electrically conductive beam-forming antenna elements overlying a secondary dielectric substrate;

a combining network for combining the received electromagnetic signal components from the array, wherein the combining network cooperates to yield or receive a radiation pattern that is generally circularly polarized at the target wavelength range; and a lower housing member, the lower housing member having base with a metallic, curved wall, and fins extending radially outward from the wall, wherein the ground plane is connected to a central region of the lower housing member.

17. The antenna system according to claim 16 wherein the ground plane comprises a metallic layer that extends radially outward with respect to a central vertical axis to substantially the same extent as an outermost perimeter of the array extends radially outward from the central vertical axis.

18. The antenna system according to claim 16 wherein the metallic antenna elements are surrounded by a finned structure.

19. The antenna system according to claim 16 further comprising:

an upper housing member connected to the lower housing member via one or more fasteners, wherein the upper housing member comprises a dielectric lid configured to enclose the beam-forming layer, the conductive ground plane, and the array.

* * * * *